US011934348B2

(12) United States Patent
Ben Dayan et al.

(10) Patent No.: US 11,934,348 B2
(45) Date of Patent: *Mar. 19, 2024

(54) PUSHING A POINT IN TIME TO A BACKEND OBJECT STORAGE FOR A DISTRIBUTED STORAGE SYSTEM

(71) Applicant: Weka.IO Ltd, Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL)

(73) Assignee: Weka.IO Ltd. (IL)

( * ) Notice: Subject to any disclaimer, the term of this patent is extended or adjusted under 35 U.S.C. 154(b) by 127 days.

This patent is subject to a terminal disclaimer.

(21) Appl. No.: 17/496,280

(22) Filed: Oct. 7, 2021

(65) Prior Publication Data

US 2022/0027312 A1    Jan. 27, 2022

Related U.S. Application Data

(63) Continuation of application No. 16/274,473, filed on Feb. 13, 2019, now Pat. No. 11,163,723.

(60) Provisional application No. 62/700,439, filed on Jul. 19, 2018.

(51) Int. Cl.
*G06F 16/11* (2019.01)
*G06F 16/13* (2019.01)
*G06F 16/182* (2019.01)

(52) U.S. Cl.
CPC .......... *G06F 16/128* (2019.01); *G06F 16/122* (2019.01); *G06F 16/134* (2019.01); *G06F 16/182* (2019.01)

(58) Field of Classification Search
CPC .... G06F 16/128; G06F 16/134; G06F 16/122; G06F 16/182; G06F 16/113
USPC ................ 707/610, 626, 640, 827
See application file for complete search history.

(56) References Cited

U.S. PATENT DOCUMENTS

| | | |
|---|---|---|
| 6,487,636 B1 | 11/2002 | Dolphin et al. |
| 7,447,839 B2 | 11/2008 | Uppala |
| 7,681,072 B1 | 3/2010 | Gibson et al. |
| 7,793,146 B1 | 9/2010 | Gibson et al. |
| 8,645,749 B2 | 2/2014 | Reche |
| 8,918,478 B2 | 12/2014 | Ozzie et al. |
| 9,087,012 B1 * | 7/2015 | Hayes ................ G06F 11/2094 |
| 9,448,887 B1 | 9/2016 | Ben Dayan et al. |
| 9,823,973 B1 * | 11/2017 | Natanzon ............... G06F 3/067 |
| 2008/0183973 A1 | 7/2008 | Aguilera et al. |
| 2010/0199125 A1 | 8/2010 | Reche |
| 2011/0219106 A1 | 9/2011 | Wright |

(Continued)

OTHER PUBLICATIONS

Int'l Search Report and Written Opinion Appln No. PCT/IB2016/001177 dated Dec. 2, 2016.

(Continued)

*Primary Examiner* — Phong H Nguyen
(74) *Attorney, Agent, or Firm* — McAndrews, Held & Malloy, Ltd.

(57) ABSTRACT

A plurality of computing devices are communicatively coupled to each other via a network, and each of the plurality of computing devices is operably coupled to one or more of a plurality of storage devices. The computing devices may push a point in time to a backend for a distributed storage system.

20 Claims, 7 Drawing Sheets

(56) References Cited

U.S. PATENT DOCUMENTS

| | | | |
|---|---|---|---|
| 2013/0325806 A1* | 12/2013 | Bachar | G06F 16/128 |
| | | | 707/638 |
| 2014/0149664 A1 | 5/2014 | Ezra et al. | |
| 2015/0205680 A1 | 7/2015 | Kimmel et al. | |
| 2015/0355971 A1 | 12/2015 | Becker-Szendy et al. | |
| 2016/0034507 A1* | 2/2016 | Aron | G06F 16/16 |
| | | | 707/722 |
| 2016/0147814 A1* | 5/2016 | Goel | G06F 16/2336 |
| | | | 707/638 |
| 2016/0246677 A1 | 8/2016 | Sangamkar et al. | |
| 2017/0199877 A1* | 7/2017 | Cosby | H04L 67/1097 |
| 2018/0260125 A1* | 9/2018 | Botes | G06F 11/1662 |
| 2018/0300203 A1* | 10/2018 | Kathpal | G06F 11/1464 |

OTHER PUBLICATIONS

Int'l Search Report and Written Opinion Appln No. PCT/IB2019/000696 dated May 1, 2020.

Barker, R, et al Storage Area Network Essentials: A Complete Guide to' Understanding and—Implementing SANs, (excerpts) John Wiley & Sons, 2002 [retrieved on Mar. 21, 2020], Retrieved from the Internet: <https://vdocuments,mx/download/storage-area-networking-essentials-a- 9-20 complete-guide-to-understanding-implementing>.

Int'l Preliminary Report on Patentability Appln No. PCT/IB2019/000696 dated Jan. 28, 2021.

* cited by examiner

PUSHING A POINT IN TIME TO A BACKEND OBJECT STORAGE FOR A DISTRIBUTED STORAGE SYSTEM

PRIORITY CLAIM

This application is a continuation of U.S. patent application Ser. No. 16/274,473, filed Feb. 13, 2019, which claims priority to United States provisional patent application 62/700,439 filed on Jul. 19, 2018. The aforementioned applications are each hereby incorporated herein by reference in their entirety.

BACKGROUND

Limitations and disadvantages of conventional approaches to data storage will become apparent to one of skill in the art, through comparison of such approaches with some aspects of the present method and system set forth in the remainder of this disclosure with reference to the drawings.

INCORPORATION BY REFERENCE

U.S. patent application Ser. No. 15/243,519 titled "Distributed Erasure Coded Virtual File System" is hereby incorporated herein by reference in its entirety.

U.S. patent application Ser. No. 16/122,524 titled "Tiering Data Strategy for a Distributed Storage System" is hereby incorporated herein by reference in its entirety.

BRIEF SUMMARY

Methods and systems are provided for pushing a point in time to a backend object storage for a distributed storage system in a distributed storage system substantially as illustrated by and/or described in connection with at least one of the figures, as set forth more completely in the claims.

DETAILED DESCRIPTION

Traditionally, file systems use a centralized control over the metadata structure (e.g., directories, files, attributes, file contents). If a local file system is accessible from a single server and that server fails, the file system's data may be lost if as there is no further protection. To add protection, some file systems (e.g., as provided by NetApp) have used one or more pairs of controllers in an active-passive manner to replicate the metadata across two or more computers. Other solutions have used multiple metadata servers in a clustered way (e.g., as provided by IBM GPFS, Dell EMC Isilon, Lustre, etc.). However, because the number of metadata servers in a traditional clustered system is limited to small numbers, such systems are unable to scale.

The systems in this disclosure are applicable to small clusters and can also scale to many, many thousands of nodes. An example embodiment is discussed regarding non-volatile memory (NVM), for example, flash memory that comes in the form of a solid-state drive (SSD). The NVM may be divided into 4 kB "blocks" and 128 MB "chunks." "Extents" may be stored in volatile memory such as, for example, RAM, for fast access, and may be backed up by NVM storage as well. An extent may store pointers for blocks, e.g., 256 pointers to 1 MB of data stored in blocks. In other embodiments, larger or smaller memory divisions may also be used. Metadata functionality in this disclosure may be effectively spread across many servers. For example, in cases of "hot spots" where a large load is targeted at a specific portion of the file system's namespace, this load can be distributed across a plurality of nodes.

Figure 1:
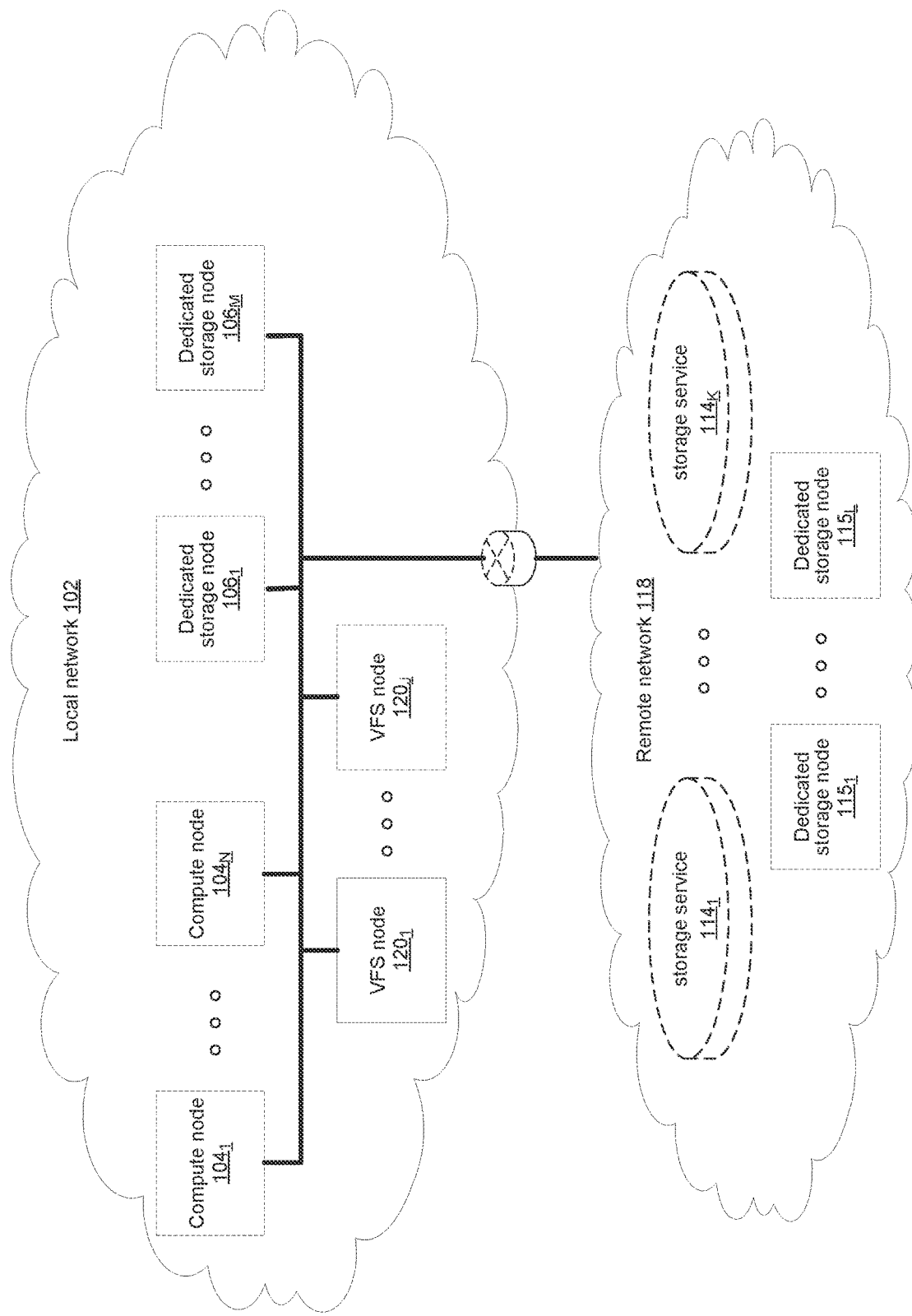
FIG. 1 illustrates various example configurations of a virtual file system in accordance with aspects of this disclosure.

FIG. 1 illustrates various example configurations of a virtual file system (VFS) in accordance with aspects of this disclosure. Shown in FIG. 1 is a local area network (LAN) 102 comprising one or more VFS nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1).

Each VFS node $120_j$ (j an integer, where 1≤j≤J) is a networked computing device (e.g., a server, personal computer, or the like) that comprises circuitry for running VFS processes and, optionally, client processes (either directly on an operating system of the device $104_n$ and/or in one or more virtual machines running in the device $104_n$).

The compute nodes 104 are networked devices that may run a VFS frontend without a VFS backend. A compute node 104 may run VFS frontend by taking an SR-IOV into the NIC and consuming a complete processor core. Alternatively, the compute node 104 may run the VFS frontend by routing the networking through a Linux kernel networking stack and using kernel process scheduling, thus not having the requirement of a full core. This is useful if a user does not want to allocate a complete core for the VFS or if the networking hardware is incompatible with the VFS requirements.

Figure 2:
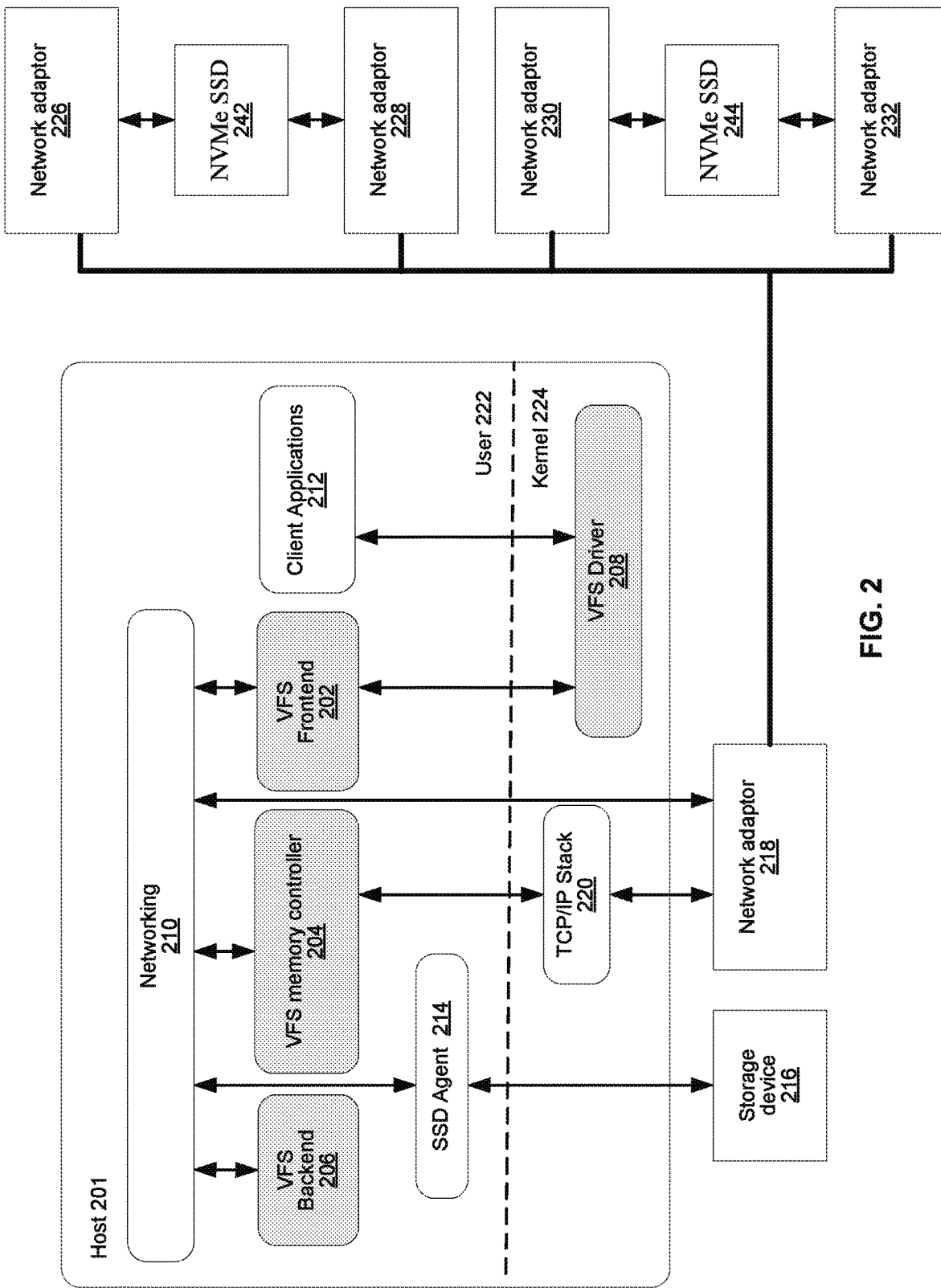
FIG. 2 illustrates an example configuration of a virtual file system node in accordance with aspects of this disclosure.

FIG. 2 illustrates an example configuration of a VFS node in accordance with aspects of this disclosure. A VFS node comprises a VFS frontend 202 and driver 208, a VFS memory controller 204, a VFS backend 206, and a VFS SSD agent 214. As used in this disclosure, a "VFS process" is a process that implements one or more of: the VFS frontend 202, the VFS memory controller 204, the VFS backend 206, and the VFS SSD agent 214. Thus, in an example implementation, resources (e.g., processing and memory resources) of the VFS node may be shared among client processes and VFS processes. The processes of the VFS may be configured to demand relatively small amounts of the resources to minimize the impact on the performance of the client applications. The VFS frontend 202, the VFS memory controller 204, and/or the VFS backend 206 and/or the VFS SSD agent 214 may run on a processor of the host 201 or on a processor of the network adaptor 218. For a multi-core processor, different VFS process may run on different cores, and may run a different subset of the services. From the perspective of the client process(es) 212, the interface with the virtual file system is independent of the particular physical machine(s) on which the VFS process(es) are running. Client processes only require driver 208 and frontend 202 to be present in order to serve them.

The VFS node may be implemented as a single tenant server (e.g., bare-metal) running directly on an operating system or as a virtual machine (VM) and/or container (e.g., a Linux container (LXC)) within a bare-metal server. The VFS may run within an LXC container as a VM environment. Thus, inside the VM, the only thing that may run is the LXC container comprising the VFS. In a classic bare-metal environment, there are user-space applications and the VFS runs in an LXC container. If the server is running other containerized applications, the VFS may run inside an LXC container that is outside the management scope of the container deployment environment (e.g. Docker).

The VFS node may be serviced by an operating system and/or a virtual machine monitor (VMM) (e.g., a hypervisor). The VMM may be used to create and run the VFS node on a host 201. Multiple cores may reside inside the single LXC container running the VFS, and the VFS may run on a single host 201 using a single Linux kernel. Therefore, a single host 201 may comprise multiple VFS frontends 202, multiple VFS memory controllers 204, multiple VFS backends 206, and/or one or more VFS drivers 208. A VFS driver 208 may run in kernel space outside the scope of the LXC container.

A single root input/output virtualization (SR-IOV) PCIe virtual function may be used to run the networking stack 210 in user space 222. SR-IOV allows the isolation of PCI Express, such that a single physical PCI Express can be shared on a virtual environment and different virtual functions may be offered to different virtual components on a single physical server machine. The I/O stack 210 enables the VFS node to bypasses the standard TCP/IP stack 220 and communicate directly with the network adapter 218. A Portable Operating System Interface for uniX (POSIX) VFS functionality may be provided through lockless queues to the VFS driver 208. SR-IOV or full PCIe physical function address may also be used to run non-volatile memory express (NVMe) driver 214 in user space 222, thus bypassing the Linux IO stack completely. NVMe may be used to access non-volatile storage device 216 attached via a PCI Express (PCIe) bus. The non-volatile storage device 216 may be, for example, flash memory that comes in the form of a solid-state drive (SSD) or Storage Class Memory (SCM) that may come in the form of an SSD or a memory module (DIMM). Other example may include storage class memory technologies such as 3D-XPoint.

The SSD may be implemented as a networked device by coupling the physical SSD, for example, the non-volatile storage device 216, with the SSD agent 214 and networking 210. Alternatively, the SSD may be implemented as a network-attached NVMe SSD 242 or 244 by using a network protocol such as NVMe-oF (NVMe over Fabrics). NVMe-oF may allow access to the NVMe device using redundant network links, thereby providing a higher level or resiliency. Network adapters 226, 228, 230 and 232 may comprise hardware acceleration for connection to the NVMe SSD 242 and 244 to transform them into networked NVMe-oF devices without the use of a server. The NVMe SSDs 242 and 244 may each comprise two physical ports, and all the data may be accessed through either of these ports.

Each client process/application 212 may run directly on an operating system or may run in a virtual machine and/or container serviced by the operating system and/or hypervisor. A client process 212 may read data from storage and/or write data to storage in the course of performing its primary function. The primary function of a client process 212, however, is not storage-related (i.e., the process is only concerned that its data is reliably stored and is retrievable when needed, and not concerned with where, when, or how the data is stored). Example applications which give rise to such processes include: email servers, web servers, office productivity applications, customer relationship management (CRM), animated video rendering, genomics calculation, chip design, software builds, and enterprise resource planning (ERP).

A client application 212 may make a system call to the kernel 224 which communicates with the VFS driver 208. The VFS driver 208 puts a corresponding request on a queue of the VFS frontend 202. If several VFS frontends exist, the driver may load balance accesses to the different frontends, making sure a single file/directory is always accessed via the same frontend. This may be done by "sharding" the frontend based on the ID of the file or directory. The VFS frontend 202 provides an interface for routing file system requests to an appropriate VFS backend based on the bucket that is responsible for that operation. The appropriate VFS backend may be on the same host or it may be on another host.

The VFS backend 206 hosts several buckets, each one of them services the file system requests that it receives and carries out tasks to otherwise manage the virtual file system (e.g., load balancing, journaling, maintaining metadata, caching, moving of data between tiers, removing stale data, correcting corrupted data, etc.)

The VFS SSD agent 214 handles interactions with a respective non-volatile storage device 216. This may include, for example, translating addresses, and generating the commands that are issued to the storage device (e.g., on a SATA, SAS, PCIe, or other suitable bus). Thus, the VFS SSD agent 214 operates as an intermediary between a non-volatile storage device 216 and the VFS backend 206 of the virtual file system. The SSD agent 214 could also communicate with a standard network storage device supporting a standard protocol such as NVMe-oF (NVMe over Fabrics).

Figure 3:
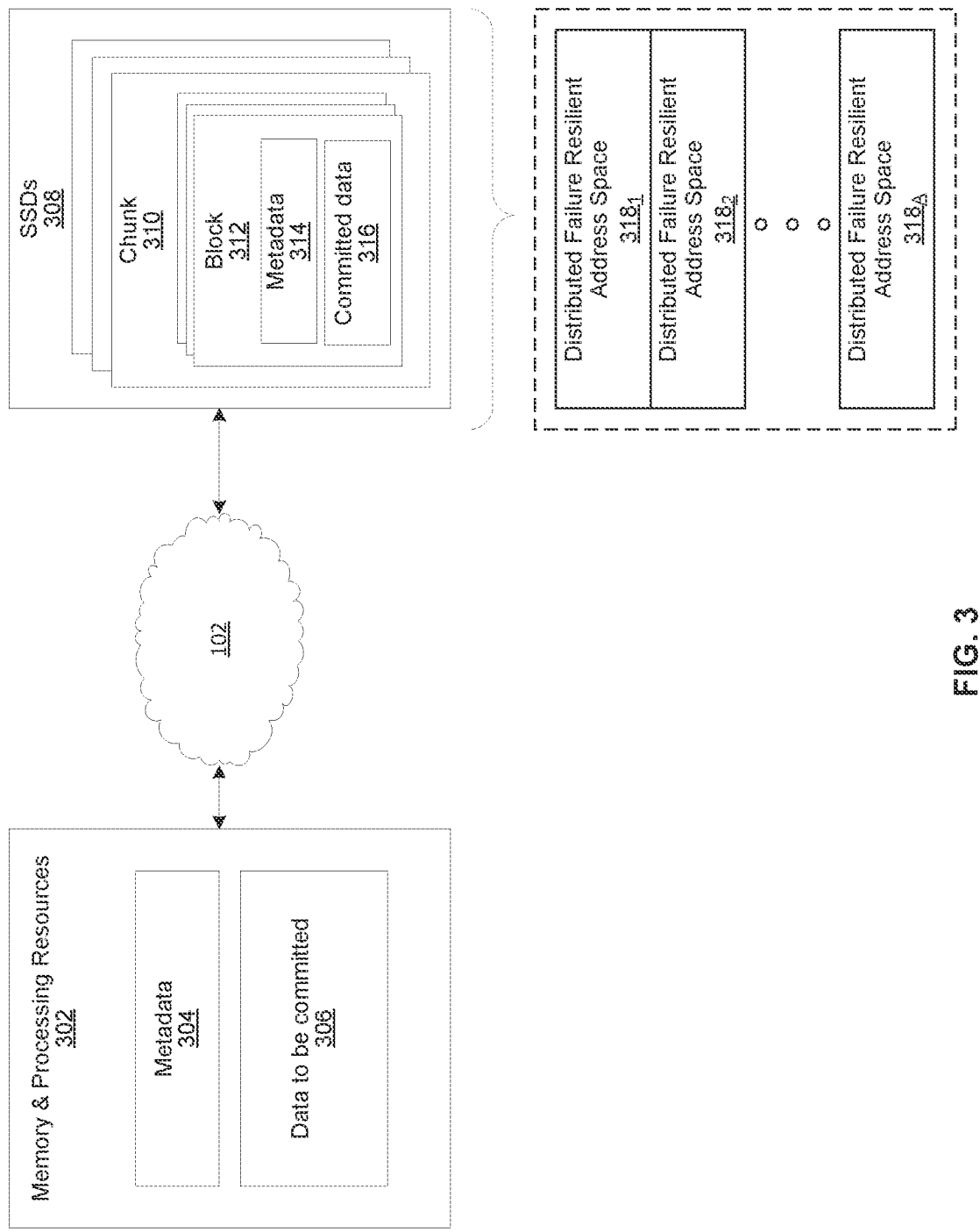
FIG. 3 illustrates an example configuration of a virtual file system node in accordance with aspects of this disclosure.

FIG. 3 illustrates another representation of a virtual file system in accordance with an example implementation of this disclosure. In FIG. 3, the element 302 represents memory resources (e.g., DRAM and/or other short-term memory) and processing (e.g., x86 processor(s), ARM processor(s), NICs, ASICs, FPGAs, and/or the like) resources of various node(s) (compute, storage, and/or VFS) on which resides a virtual file system, such as described regarding FIG. 2A above. The element 308 represents the one or more physical non-volatile storage devices 216 which provide the long term storage of the virtual file system.

As shown in FIG. 3, the physical storage is organized into a plurality of distributed failure resilient address spaces (DFRASs) 318. Each of which comprises a plurality of chunks 310, which in turn comprises a plurality of blocks 312. The organization of blocks 312 into chunks 310 is only a convenience in some implementations and may not be done in all implementations. Each block 312 stores committed data 316 (which may take on various states, discussed below) and/or metadata 314 that describes or references committed data 316.

The organization of the storage 308 into a plurality of DFRASs enables high performance parallel commits from many—perhaps all—of the nodes of the virtual file system (e.g., all nodes $104_1$-$104_N$, $106_1$-$106_M$, and $120_1$-$120_J$ of FIG. 1 may perform concurrent commits in parallel). In an example implementation, each of the nodes of the virtual file system may own a respective one or more of the plurality of DFRAS and have exclusive read/commit access to the DFRASs that it owns.

Each bucket owns a DFRAS, and thus does not need to coordinate with any other node when writing to it. Each bucket may build stripes across many different chunks on many different SSDs, thus each bucket with its DFRAS can choose what "chunk stripe" to write to currently based on many parameters, and there is no coordination required in order to do so once the chunks are allocated to that bucket. All buckets can effectively write to all SSDs without any need to coordinate.

Each DFRAS being owned and accessible by only its owner bucket that runs on a specific node allows each of the nodes of the VFS to control a portion of the storage 308 without having to coordinate with any other nodes (except during [re] assignment of the buckets holding the DFRASs during initialization or after a node failure, for example, which may be performed asynchronously to actual reads/commits to storage 308). Thus, in such an implementation, each node may read/commit to its buckets' DFRASs independently of what the other nodes are doing, with no requirement to reach any consensus when reading and committing to storage 308. Furthermore, in the event of a failure of a particular node, the fact the particular node owns a plurality of buckets permits more intelligent and efficient redistribution of its workload to other nodes (rather the whole workload having to be assigned to a single node, which may create a "hot spot"). In this regard, in some implementations the number of buckets may be large relative to the number of nodes in the system such that any one bucket may be a relatively small load to place on another node. This permits fine grained redistribution of the load of a failed node according to the capabilities and capacity of the other nodes (e.g., nodes with more capabilities and capacity may be given a higher percentage of the failed nodes buckets).

To permit such operation, metadata may be maintained that maps each bucket to its current owning node such that reads and commits to storage 308 can be redirected to the appropriate node.

Load distribution is possible because the entire file system metadata space (e.g., directory, file attributes, content range in the file, etc.) can be broken (e.g., chopped or sharded) into small, uniform pieces (e.g., "shards"). For example, a large system with 30k servers could chop the metadata space into 128k or 256k shards.

Each such metadata shard may be maintained in a "bucket." Each VFS node may have responsibility over several buckets. When a bucket is serving metadata shards on a given backend, the bucket is considered "active" or the "leader" of that bucket. Typically, there are many more buckets than VFS nodes. For example, a small system with 6 nodes could have 120 buckets, and a larger system with 1,000 nodes could have 8k buckets.

Each bucket may be active on a small set of nodes, typically 5 nodes that that form a penta-group for that bucket. The cluster configuration keeps all participating nodes up-to-date regarding the penta-group assignment for each bucket.

Each penta-group monitors itself. For example, if the cluster has 10k servers, and each server has 6 buckets, each server will only need to talk with 30 different servers to maintain the status of its buckets (6 buckets will have 6 penta-groups, so 6*5=30). This is a much smaller number than if a centralized entity had to monitor all nodes and keep a cluster-wide state. The use of penta-groups allows performance to scale with bigger clusters, as nodes do not perform more work when the cluster size increases. This could pose a disadvantage that in a "dumb" mode a small cluster could actually generate more communication than there are physical nodes, but this disadvantage is overcome by sending just a single heartbeat between two servers with all the buckets they share (as the cluster grows this will change to just one bucket, but if you have a small 5 server cluster then it will just include all the buckets in all messages and each server will just talk with the other 4). The penta-groups may decide (i.e., reach consensus) using an algorithm that resembles the Raft consensus algorithm.

Each bucket may have a group of compute nodes that can run it. For example, five VFS nodes can run one bucket. However, only one of the nodes in the group is the controller/leader at any given moment. Further, no two buckets share the same group, for large enough clusters. If there are only 5 or 6 nodes in the cluster, most buckets may share backends. In a reasonably large cluster there many distinct node groups. For example, with 26 nodes, there are more than 64,000

$$\left(\frac{26!}{5!*(26-5)!}\right)$$

possible five-node groups (i.e., penta-groups).

All nodes in a group know and agree (i.e., reach consensus) on which node is the actual active controller (i.e., leader) of that bucket. A node accessing the bucket may remember ("cache") the last node that was the leader for that bucket out of the (e.g., five) members of a group. If it accesses the bucket leader, the bucket leader performs the requested operation. If it accesses a node that is not the current leader, that node indicates the leader to "redirect" the access. If there is a timeout accessing the cached leader node, the contacting node may try a different node of the same penta-group. All the nodes in the cluster share common "configuration" of the cluster, which allows the nodes to know which server may run each bucket.

Each bucket may have a load/usage value that indicates how heavily the bucket is being used by applications running on the file system. For example, a server node with 11 lightly used buckets may receive another bucket of metadata to run before a server with 9 heavily used buckets, even though there will be an imbalance in the number of buckets used. Load value may be determined according to average response latencies, number of concurrently run operations, memory consumed or other metrics.

Redistribution may also occur even when a VFS node does not fail. If the system identifies that one node is busier than the others based on the tracked load metrics, the system can move (i.e., "fail over") one of its buckets to another server that is less busy. However, before actually relocating a bucket to a different host, load balancing may be achieved by diverting writes and reads. Because each write may end up on a different group of nodes, decided by the DFRAS, a node with a higher load may not be selected to be in a stripe to which data is being written. The system may also opt to not serve reads from a highly loaded node. For example, a "degraded mode read" may be performed, wherein a block in the highly loaded node is reconstructed from the other blocks of the same stripe. A degraded mode read is a read that is performed via the rest of the nodes in the same stripe, and the data is reconstructed via the failure protection. A degraded mode read may be performed when the read latency is too high, as the initiator of the read may assume that that node is down. If the load is high enough to create higher read latencies, the cluster may revert to reading that data from the other nodes and reconstructing the needed data using the degraded mode read.

Each bucket manages its own distributed erasure coding instance (i.e., DFRAS 318) and does not need to cooperate with other buckets to perform read or write operations. There are potentially thousands of concurrent, distributed erasure coding instances working concurrently, each for the different bucket. This is an integral part of scaling performance, as it effectively allows any large file system to be divided into independent pieces that do not need to be coordinated, thus providing high performance regardless of the scale.

Each bucket handles all the file systems operations that fall into its shard. For example, the directory structure, file attributes, and file data ranges will fall into a particular bucket's jurisdiction.

An operation done from any frontend starts by finding out what bucket owns that operation. Then the backend leader, and the node, for that bucket is determined. This determination may be performed by trying the last-known leader. If the last-known leader is not the current leader, that node may know which node is the current leader. If the last-known leader is not part of the bucket's penta-group anymore, that backend will let the front end know that it should go back to the configuration to find a member of the bucket's penta-group. The distribution of operations allows complex operations to be handled by a plurality of servers, rather than by a single computer in a standard system.

If the cluster of size is small (e.g., 5) and penta-groups are used, there will be buckets that share the same group. As the cluster size grows, buckets are redistributed such that no two groups are identical.

Various embodiments of the storage system may allow taking a snapshot to save a data set at a particular point in time. The snapshot may comprise, for example, differential information with respect to a previous snapshot or an image. The storage system may allow snapshots at a file system level for a group of data storage devices such as, for example, a bucket level. The snapshots may then be saved to the backend object storage such that the backend object storage stores a complete copy of the file system in a way that it may be read and used from a completely different cluster, such as, for example, a different data center. Accordingly, the state of the registry may need to be recovered on the new system with all inodes and extents that will basically store all the structure of the system. The process of saving the snapshot to the backend object storage may be referred to as, for example, snapshot to object storage. The backend object storage may be similar to, for example, the storage device 216, 222, 230, or 308.

When the snapshot data is managed at the bucket level, the snapshot workload may be shared across all buckets. Therefore, each bucket manages all the snapshots for all of its managed objects such as, for example, directories, inodes, file data ranges, etc. A processor, such as, for example, a processor of the host 201 or on a processor of the network adaptor 218, or any other processor that may be appropriate as shown on FIGS. 1 and 2, may be used for managing the snapshots, including storing the snapshots to backend object storage, etc. For example, the snapshot management may be performed by the leader of a bucket. The snapshot management may be visible to a user via, for example, a user interface.

Figure 4:
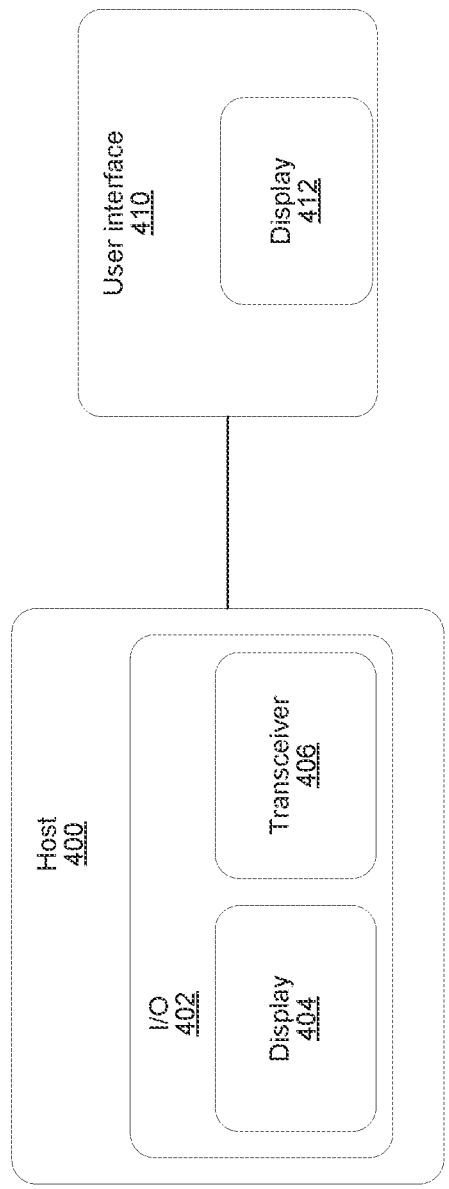
FIG. 4 illustrates a user interface for a storage system in accordance with an example implementation of this disclosure.

FIG. 4 illustrates a user interface for an example host of a storage system in accordance with an example implementation of this disclosure. Referring to FIG. 4, there is shown a host 400 communicatively coupled, either wired or wirelessly, to the user interface 410. The host 400 may be similar to the host 201. The host 400 may also have, for example, an input/output (I/O) interface 402 that allows communication with the user interface 410. The I/O interface 402 may also comprise one or more input devices such as, for example, mouse, trackball, keyboard, buttons, touch panel, etc. that allows a user to enter information. The I/O interface 402 may also have one or more output devices such as, for example, lights/LEDs, speaker, display, etc. that allows a user to see or hear various outputs. Accordingly, the host 400 may have a display 404. The host 400 may also have, for example, a transceiver 406 that may be suitable for communicating with another electronic device via one or more wired protocols and/or one or more wireless protocols. Wired protocols may be, for example, USB, Firewire, SCSI, etc. Wireless protocols may be, for example, a cellular protocol, WiFi, Bluetooth, NFC (Near Field Communication), etc.

Accordingly, the I/O stack 210, the TCP/IP stack 220, and/or the network adaptor 218 may be thought of as being a part of the I/O interface 402. The I/O interface 402 may be a logical grouping of input/output devices and applicable software.

Various embodiments may also communicate with the user interface 410, which may be similar to the I/O interface 402.

Depending on the application software, the user interface 410 and/or the I/O interface 402 may be used to access information, status, etc. for any level of the storage system. For example, the access may be to a specific node, a file system, the entire storage system, etc.

A snapshot may be taken on demand by a user, periodically, or at certain set times. When a snapshot is allowed to be taken may be a design and/or implementation decision. The user may determine when the snapshots are taken.

In an example embodiment, the snapshot to object storage may be done concurrently on all buckets. Since a storage system may have many buckets, the storage system report may be a report of the worst-case bucket. That is, the storage system report for snapshot to object storage is for the slowest bucket in the storage system. Therefore, the storage system report for the state of the snapshot to object storage for the storage system may be the state of the slowest of all the buckets that is performing its snapshot to object storage. Accordingly, if there is at least one bucket whose state is in-progress for storing its snapshot to the backend object storage, then the storage system snapshot to object storage state is shown as in-progress. To show a storage system state of "stored" for the snapshot to object storage process, all buckets must be at the "stored" state.

Various example embodiments may take an initial snapshot of a data set for a bucket, and subsequent snapshots may copy the changed data. A system of pointers may be used to reference the initial snapshot and subsequent snapshots.

Each inodeid for a file (or directoryid for a directory, etc.) may also have a snapshot index (or snapshotID). There may also be a constant special snapshot index that never changes. This special snapshot index is the current view (or the latest snapshot) of the file system, and may be referred to as "defaultSnapID." This special snapshot index may constantly store the differential information as the file system is changed, and a snapshot will keep that information at a particular point in time. When the snapshot is taken, the snapshot information will be saved at a new snapshot index and the defaultSnapID will gather new information from that point on.

A full inodeId may comprise, for example, the basic inodeId+snapshotID. The registry may keep track for each object it manages the "current" instance for that object by using inodeId+defaultSnapID to locate the current snapshot.

As snapshots may be taken multiple times, there may be a tree of snapshots that is managed by the configuration service of the cluster of nodes for the storage system. The configuration service of the cluster may keep track of, for example, what nodes are available, and what current buckets are on the storage system. Accordingly, all buckets may know the relationships among snapshots. A snapshot may be written to since it is a "clone," and a snapshot may be taken of the altered snapshot. But even if the snapshot configuration has just a single line going forward to the next snapshot, knowledge of how the snapshots are ordered may be needed to view a specific snapshot.

When writing over a file after a snapshot and the file has an extent with the most up-to-date snapshotID, that extent may be altered. If an extent with the latest snapshot index (snapshotID) cannot be retrieved from the registry, the latest snapshotID may be fetched from the registry by fetching the special entry that asks for the latest extent for this extentId, which the registry keeps. Another extent may then be created with the right extentId and the most up-to-date snapshotID. This latest extent now has a pointer to the previous extent that is relevant and a standard write may be performed. A previous extent is relevant if it has the snapshotID of the extent that was received from the registry.

All the changes that are made in a context of a snapshot may be kept in an OnDiskHash (ODH). That ODH can be used in case a snapshot is deleted. For example, all the entries of that ODH can be reviewed. Changes that occurred in a deleted snapshot may be pushed to later snapshots, and all other changes may be discarded. As an example, if there is file modification information for a file that does not exist in the next snapshot, there is no need to keep that information if that snapshot is deleted.

The ODH table may contain all modifications that happened in the last snapshot in an un-ordered way. So even if an extent was modified few times, there may only be one entry. If a file was created, but then deleted before another snapshot is taken, the ODH table will contain no reference to that file.

Since the file system may always have a snapshot active (even it was just created), the root inode that is created is part of that initial ODH table for the base snapshot of the system.

A snapshot to object storage operation may upload the snapshot and a snapshot configuration tree so the file system configuration can be recovered. These may be relatively small data that can be serialized in a memory buffer and saved as an object with a known name on the object storage bucket.

The snapshot tree may store what snapshots have been pushed to (stored in) the object storage. Also, the snapshot configuration tree may include the snapshot to object storage status for each snapshot. The status may be, for example, "None" if there was no snapshot to object storage requested, "In-progress" if a snapshot is currently being pushed to the object storage, or "Stored" if the process is complete. Various embodiments may have different status indicators.

Figure 5:
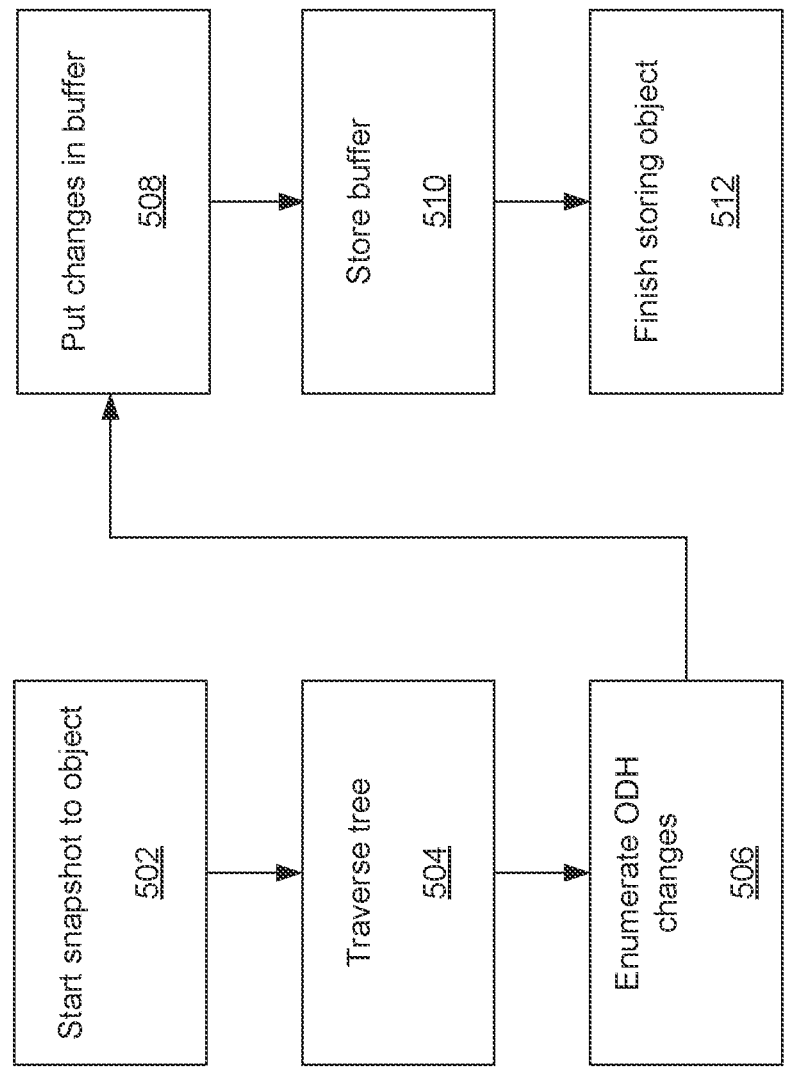
FIG. 5 illustrates an example flow diagram for storing a snapshot in a backend object storage in accordance with an example implementation of this disclosure.

FIG. 5 illustrates an example flow diagram for storing a snapshot in a backend object storage in accordance with an example implementation of this disclosure. Referring to FIG. 5, there is shown the flow diagram 500 comprising blocks 502 to 510. At block 502, a snapshot to object storage operation may be requested. This may be an on-demand request from a user, or a request at a pre-determined time. The file system may be, for example, a multi-node bucket. At block 504 the file system may traverse the snapshot configuration tree until it finds the first snapshot that was taken. In some cases, there may not be any previous snapshots.

At block 506, the file system may go over the ODH table in the required order or preferred order to enumerate the changes on that ODH table. This may comprise also looking at the later ODH entries to determine whether there is a more up-to-date change for a particular object(s) (file, directory, data range, etc.) and only uploading that object(s). For example, if a file was created in an ODH table, but then it was deleted, it need not be uploaded as information to the object storage.

At block 508, the file system then aggregates these changes into buffers of predetermined size, which may be, for example, about 10 MB. At block 510, once such a buffer is full it may be uploaded to the object storage with the name of the snapshot and the index of the buffer. Small file data may be aggregated into such buffers as small objects may not be stored efficiently on the object storage. Depending on the snapshot, there may be multiple buffers stored in the object storage. If there is a large extent that needs to be pushed to the object storage, then that object may be sent as if the data were tiered and then the extent may be marked at the ODH table as tiered and it is stored in the buffer as such. Tiering is described in more detail in the U.S. Non-Provisional application Ser. No. 16/122,524 titled "Tiering Data Strategy for a Distributed Storage System" filed on Sep. 5, 2018 (U.S. Provisional Application 62/585,204, filed on Nov. 13, 2017) and which is incorporated herein in its entirety.

At block 512, when the last buffer is sent, the file system may then know how many buffers were created, and may write an object describing that snapshot on the object storage with the snapshot configuration details and how many such buffers describe that snapshot.

Various example embodiments may also have multiple ODH tables.

Figure 6:
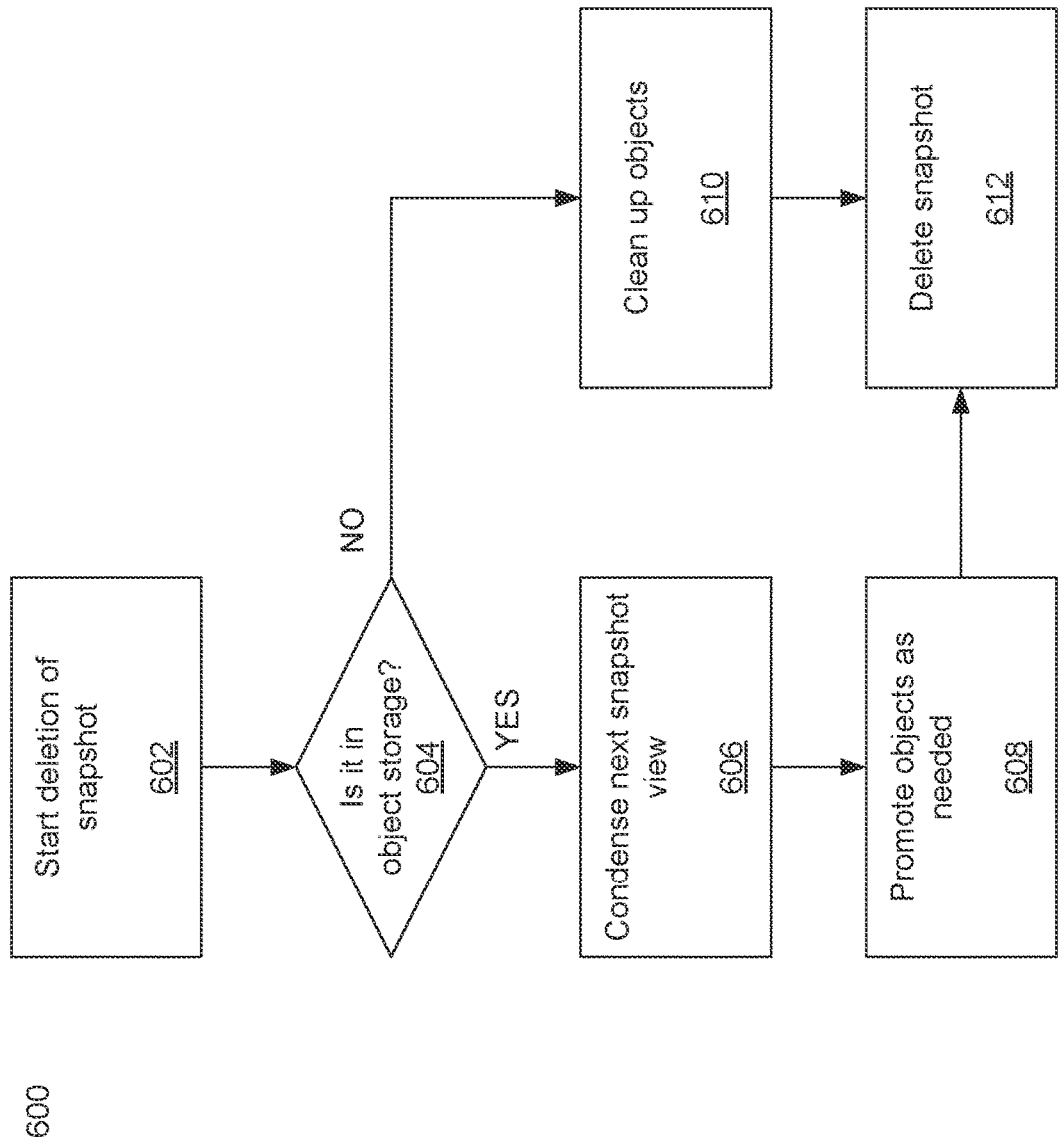
FIG. 6 illustrates an example flow diagram of deletion of a snapshot in accordance with an example implementation of this disclosure.

FIG. 6 illustrates an example flow diagram of deletion of a snapshot in accordance with an example implementation of this disclosure. Referring to FIG. 6, there is shown the flow diagram 600 comprising blocks 602 to 612. At block 602, a snapshot deletion may be requested. This may be an on-demand request from a user, or a request from the file system as part of routine cleaning. At block 604, the file system may check whether the snapshot was pushed to object storage. If the snapshot was pushed to object storage, then the file system may go to block 606 to create a condensed view of the next snapshot that is stored on the object storage as there is now information on the old snapshot that is not needed anymore. At block 608, the objects that do need to be kept on the object storage may need to be promoted, and the next-in-line snapshot may be re-uploaded to the object storage as if the deleted snapshot did not exist. Similarly, there may be a process of condensing several snapshots if not all of them are pushed. After the new view of the next-in-line snapshot is uploaded to the object storage, the file system may go to block 612 to delete the snapshot that was selected to be deleted, and also to delete the previous presentation of the next-in-line snapshot that was relevant when that snapshot was still alive.

At block 604, if the snapshot has not been pushed to the object storage, the next step may be to block 610. At block 610, as part of deleting a snapshot that is not in the object storage, the file system, for example, the bucket, may enumerate the objects that belong to the snapshot and remove them. To do this, the bucket may have to scan up the tree to find the first snapshot of the tree (the "−1 version").

If there is no instance of the inode in the next snapshot, the inode is moved to that snapshot. Otherwise the snapshot can be removed. If the inode in the next snapshot is a tombstone, indicating that the file has been deleted, and there is no −1 version, they can both be removed. The process may also not search for the −1 version, and leave the tombstone.

Dirents (directory entries such as, for example, sub-directories and/or files) may be treated the same as inodes for snapshot deletion.

If the extent is not present in the next snapshot, a pointer is created in the next snapshot that points to the extent in the deleted snapshot. This may allow the original extent to still reference the blocks, while the registry is still able to reference the extent. The pointer is in the object index of the next snapshot.

If an extent exists in the next snapshot, any blocks that are not referenced from that extent are freed. If all blocks are freed, the extent itself can be removed.

At block 610, when a snapshot that contains a pointer is deleted, the pointer is moved to the next snapshot if there is not an extent in the next snapshot. If there is an extent in the next snapshot, the pointed extent may be examined as if its snapshot was just deleted. At block 612, the snapshot may be deleted.

Accordingly, differential uploads of data may be provided with snapshot to object storage of snapshots, and snapshots that are not needed anymore may be deleted.

When deleting a snapshot from the object storage, the storage system may wait until all buckets finish putting the next-in-line snapshot in the new view, and then all the buckets may delete the deleted snapshot and the old view of the next-in-line snapshot. This may be done so that if there is a failure during the process, and few buckets have already finished writing the new view of the next-in-line snapshot, a coherent view can still be made.

The snapshot to object storage operation and deleting of snapshots may be done as background processes that do not have to finish quickly. Also, an assumption may be that the object storage has more spare capacity than needed for the final storage of a snapshot. This may be because the intermediate steps may require more working storage than a size of the final storage of the snapshot.

Accordingly, pushing a complete snapshot coherently into the backend object storage in a way that the original cluster is not required means that it can be used as a physical backup. Therefore, in case something happened to the original snapshot, a copy of the original snapshot may be recovered from the object storage. Another system may also be brought up concurrently to present the content of the snapshot as a restore point from another location while the system is "live" on other servers. This snapshot used as a restore point may be in a "read-only" mode, for example, to keep the snapshot from being changed.

Similarly, if the object storage is stored on a different data center, the cloud, or in a compound mode where there is more than a single object storage, (as described further in the U.S. Non-Provisional application Ser. No. 16/122,524 (U.S. Provisional Application 62/585,204), and which is incorporated herein in its entirety), then a new cluster may be formed on the other data center or using on-demand cloud instances, and that file system on the new cluster may be used to continue work.

The snapshots in the backend object storage may also be used for "cloud bursting" or "follow the sun" workflows. Cloud bursting or follow the sun allows creating content in one data center, and then pushing the work to another data center. Cloud bursting may mean pushing to another site, while "follow the sun" may mean cycling the work over three datacenters geographically spread in such a way that there is continuous work over the same data as workers in each datacenter uses their data at that datacenter.

For example, "follow the sun" workflow may be used by a company with a datacenter in the United States, one in England, and one in China, or other cities so they are 8 hours apart. They then have the active FS operating during business hours at each location, and then the active FS moves to the next location. The non-active location may access the data "off hours" by accessing the active site. This may allow, for example, the best service to the group working during business hours, which may be the largest group at that time. This may also save cost by using fewer international network lines.

Additionally, in case of a catastrophic event to one of the data centers, this may also provide business continuity from the rest of the world. This may be achieved, for example, by having an object storage at each site, where the system pushes three times (compound object storage), or the object storage solution replicates from one site to the next. Some object storage solutions may use erasure coding techniques to write over three sites in such a fashion that any one of the sites can fail. For example, if the information is protected using 11+7 protection that is distributed over the 3 sites, then any one site falling will only bring down six copies, and the system can continue working.

Cloud bursting may be an example of human-produced work done on premises, and then, when the work is ready, the data may be pushed to a public cloud where a large number of computers or processors, which may be far larger than an organization can keep on its premises, may be able to perform the computations and return the results quickly. For example, the type of work that may use cloud bursting may comprise artists creating a scene to be rendered for an animated movie, scientists working on a CFD (computational fluid dynamics) model simulating a wind tunnel for a new car, etc. This may be especially useful for a storage system that scales linearly with resources. As an example, if a movie scene can be rendered by 100 instances in 10 days, it may be able to be rendered in just a single day if given 1000 instances. Since the public cloud may charge by the hour, the overall cost of the computation will be the same, but the results will be delivered 10 times faster.

Figure 7:
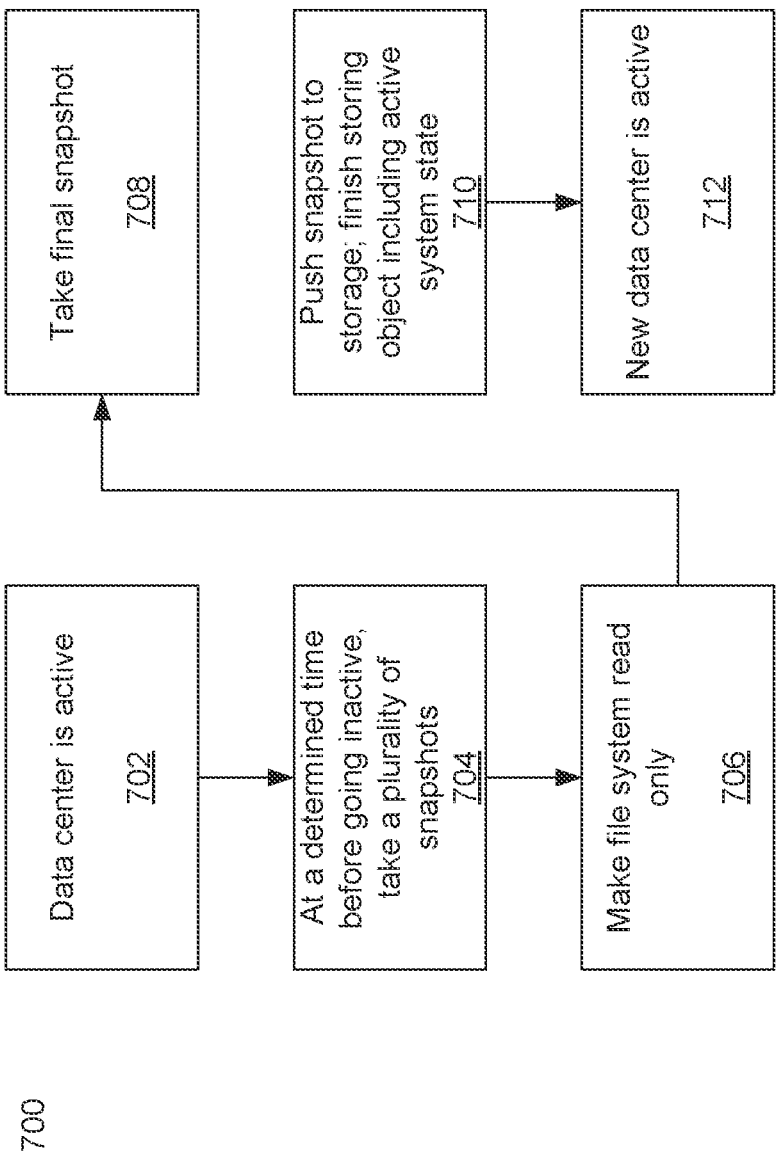
FIG. 7 illustrates an example flow diagram of moving from one active data center to another active data center in accordance with an example implementation of this disclosure.

FIG. 7 illustrates an example flow diagram of moving from one active data center to another active data center in accordance with an example implementation of this disclosure. Referring to FIG. 7, there is shown a flow diagram 700 with blocks 702 to 710. At block 702, a present datacenter may be determined to be the active data center. Accordingly, only the present data center may mount the FS with read/ write permissions and continue creating and pushing snapshots to the object storage solution. The other datacenter(s) may not exist (in case of cloud bursting, the public cloud instances may simply not be there), don't have the file system mounted at all, or the file system is mounted in a read-only fashion, so no data may be changed.

At block 704, a pre-determined time before the present data center is determined to be inactive may be reached. The pre-determined time may vary with various embodiments and/or may be set by a user. After the pre-determined time is reached, the present data center may have its file system(s) take one or more snapshots and push those snapshots to object storage. These snapshots may be periodic or aperiodic. Since there is a period of forced inactivity when the switch happens from one data center being active to another data center being active, various embodiments may use methods to minimize the inactive time. For example, snapshots may be taken close together near when the switch is needed, and these snapshots may be pushed to object storage. Accordingly, by the time the switch is needed, there may be minimal differential data that is not stored on the object storage system. Therefore, storing this minimal differential data will not take long to store, and the resulting inactivity period may be very short. For example, the inactivity period may be sub-second or just a few seconds.

At block 706, when the time is reached for switching to a new active data center, the "active" file system(s) may mount itself as read-only. At block 708, a snapshot may be taken for the last time by the present active data center. At block 710, that snapshot may be pushed to (or stored in) the object storage. Various embodiments may also store the "active" system state on the object storage. When there is a standard handover the switching-out system may use the system state to start the new system in the new active data center. In case there is a failure on the native system, there may be a manual process that allows setting the active system as a different one, and picking the last full snapshot to start executing from.

At block 712, once the snapshot is fully stored on the object storage for all the file system(s) of the present data center, the next data center may be marked as "active," and that data center may start working from the snapshot saved to the object storage by the present data center.

Accordingly, it can be seen that an example implementation of the disclosure may be a method for a distributed storage system, comprising taking a snapshot of a file system, distributed across multiple storage nodes, of a first data center, where the first data center is an active data center. The snapshot may be stored to object storage and a second data center may be indicated that it is the active data center. The file system may be distributed across five nodes.

The first data center may make the file system read only prior to taking the snapshot. The snapshot may be a final snapshot by the first data center prior to going to a non-active data center status. When a first pre-determined period is reached before going to the non-active data center status, one or more snapshots may be taken prior to the final snapshot, and the one or more snapshots may be stored to object storage. The distributed storage system is used for one of: cloud burst configuration or follow the sun configuration.

Another example implementation of the disclosure may be a method for a distributed storage system, comprising storing a snapshot of a file system, distributed across multiple storage nodes, to a backend object storage. The method may comprise traversing a snapshot configuration tree to determine changes to the file system, reading an on-disk hash (ODH) table to enumerate changes to the ODH table, putting the changes to the file system and the changes to the ODH table in one or more buffers, and storing the buffer in the backend object storage. The file system may be distributed across five nodes.

The method may comprise storing a final object to the backend object storage, where the final object may include the number of the one or more buffers. Each of the one or more buffers may comprise a name of the snapshot and an index of the each of the one or more buffers. The snapshot configuration tree may be traversed to find the first snapshot. Reading the ODH table may comprise looking at later ODHs to determine whether there may be a more up-to-date change for an object, and when the more up-to-date change for an object is found, only the more up-to-date change may be stored in the backend object storage. At least one data file may be aggregated into at least one of the one or more buffers when the at least one data file is less than a pre-determined size.

Another implementation of the disclosure may be a distributed storage system comprising a file system distributed across multiple storage nodes, and a processor, where the processor may be configured to store a snapshot of the file system. The system may comprise the processor traversing a snapshot configuration tree to determine changes to the file system, reading an on-disk hash (ODH) table to enumerate changes to the ODH table, putting the changes to the file system and the changes to the ODH table in one or more buffers, and storing the buffer in the backend object storage.

The processor may be configured to store a final object to the backend object storage, where the final object comprises the number of the one or more buffers. The processor may also be configured to traverse the snapshot configuration tree to find the first snapshot. The processor may additionally be configured to aggregate at least one data file into at least one of the one or more buffers when the at least one data file is less than a pre-determined size.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration.

As utilized herein, the terms "e.g." and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A method for distributing storage, comprising:
taking a snapshot of a file system in a first data center;
storing the snapshot to a bucket in an object storage; and
activating a second data center, wherein:
the first data center is an active data center when the snapshot is taken,
the file system comprises a plurality of devices and a plurality of buckets,
each bucket in the plurality of buckets is associated with a group of devices selected from the plurality of devices, and
no two buckets in the plurality of buckets are associated with the same group of devices.

2. The method of claim 1, wherein each group of devices comprises five devices.

3. The method of claim 1, wherein the first data center readies the file system prior to taking the snapshot.

4. The method of claim 3, wherein the snapshot is a final snapshot by the first data center prior to going to a non-active data center status.

5. The method of claim 4, wherein at a first pre-determined period before going to the non-active data center status, one or more snapshots are taken prior to the final snapshot.

6. The method of claim 5, wherein the one or more snapshots are stored in the object storage.

7. The method of claim 1, wherein the first data center stores its active system state to the object storage.

8. The method of claim 1, wherein the method is performed according to a time of day.

9. A method for distributing storage, comprising:
taking a plurality of snapshots of a file system;
generating a snapshot configuration tree according to the plurality of snapshots of the file system;
determining changes to the file system according to a snapshot configuration tree;
determining changes to an on-disk hash (ODH) table;
storing the changes to the file system and the changes to the ODH table in one or more buffers in a backend object storage, wherein:
the file system comprises a plurality of devices and a plurality of buckets,
each bucket in the plurality of buckets is associated with a group of devices selected from the plurality of devices, and
no two buckets in the plurality of buckets are associated with the same group of devices.

10. The method of claim 9, wherein each group of devices comprises five devices.

11. The method of claim 9, comprising storing a final object to the backend object storage, wherein the final object comprises a number of the one or more buffers.

12. The method of claim 9, wherein each of the one or more buffers comprises a name of the snapshot and an index of the each of the one or more buffers.

13. The method of claim 9, wherein the snapshot configuration tree is traversed to find a first snapshot.

14. The method of claim 9, comprising looking at later ODHs to determine whether there is a more up-to-date change for an object.

15. The method of claim 14, wherein when the more up-to-date change for an object is found, only the more up-to-date change is stored in the backend object storage.

16. The method of claim 9, wherein at least one data file is aggregated into at least one of the one or more buffers when the at least one data file is less than a pre-determined size.

17. A system comprising:
a plurality of devices;
a plurality of bucket groups, wherein:
each bucket in the plurality of buckets is associated with a group of devices selected from the plurality of devices,
no two buckets in the plurality of buckets are associated with the same group of device; and
a processor, wherein the processor is configured to:
take a plurality of snapshots of a file system;
generating a snapshot configuration tree according to the plurality of snapshots of the file system;
determine changes to the file system according to a snapshot configuration tree,
determine changes to an on-disk hash (ODH) table, and
store the changes to the file system and the changes to the ODH table in one or more buffers in a backend object storage that comprises a bucket.

18. The system of claim 17, wherein the processor is configured to store a final object to the backend object storage, and wherein the final object comprises a number of the one or more buffers.

19. The system of claim 17, wherein the processor is configured to traverse the snapshot configuration tree to find a first snapshot.

20. The system of claim 17, wherein the processor is configured to aggregate at least one data file into at least one of the one or more buffers when the at least one data file is less than a pre-determined size.

* * * * *